US006717758B2

United States Patent
Adams et al.

(10) Patent No.: US 6,717,758 B2
(45) Date of Patent: Apr. 6, 2004

(54) DISK PARTITIONING TO CREATE A USABLE, LOWER CAPACITY DISK CARTRIDGE

(75) Inventors: Chad Adams, Roy, UT (US); Eric Ryon Peters, Roy, UT (US); Robert L. Short, Niwot, CO (US); Mark Reimann, Layton, UT (US); Daniel D. Rochat, Ogden, UT (US)

(73) Assignee: Iomega Corporation, San Diego, CA (US)

( * ) Notice: Subject to any disclaimer, the term of this patent is extended or adjusted under 35 U.S.C. 154(b) by 290 days.

(21) Appl. No.: 09/854,719

(22) Filed: May 15, 2001

(65) Prior Publication Data

US 2002/0171979 A1 Nov. 21, 2002

(51) Int. Cl.[7] .............................................. G11B 27/36
(52) U.S. Cl. .............................. 360/31; 360/48; 360/60
(58) Field of Search .......................... 360/60, 25, 53, 360/31, 48, 69, 78.04, 75, 132, 133; 324/210, 212, 226; 369/53.1, 53.2, 53.24, 53.41, 53.13, 53.12

(56) References Cited

U.S. PATENT DOCUMENTS

| 5,917,669 | A | * | 6/1999 | Johnson | 360/53 |
| 6,084,732 | A | * | 7/2000 | Lee | 360/53 |
| 6,204,660 | B1 | * | 3/2001 | Lee | 324/212 |

* cited by examiner

Primary Examiner—Alan T. Faber
(74) Attorney, Agent, or Firm—James T. Hagler

(57) ABSTRACT

A disk is manufactured having a reduced capacity based on a quantity of addressable and non-addressable portions. The method of formatting the disk comprises identifying a first quantity of the storage portions; and labeling the first quantity of storage portions as non-addressable storage portions such that the non-addressable storage portions cannot be accessed by a user or a disk drive. The first quantity of storage portions may include addressable portions designated as non-addressable portions.

9 Claims, 3 Drawing Sheets

DISK PARTITIONING TO CREATE A USABLE, LOWER CAPACITY DISK CARTRIDGE

FIELD OF THE INVENTION

The present invention relates to a data storage cartridge. More particularly, the present invention relates to partitioning non-addressable storage areas on a data storage medium for use in a lower capacity data storage cartridge that is compatible with a higher capacity disk drive.

BACKGROUND OF THE INVENTION

Computers process various types of data; such data may be in the form of a text file, an audio file, a video file or the like. Regardless of the form, data must be stored on a data storage device, such as, for example, a data storage cartridge or disk, for the computer to access and subsequently process the stored data. Typically, data storage devices have an associated storage medium disposed therein that allows a computer to save and recall data using a disk drive.

Magnetic storage media have proven to be excellent data storage media because they are relatively inexpensive and have the ability to store large amounts of data. In order to manufacture a suitable data storage cartridge having a magnetic storage medium, the medium must have sufficient storage capacity. Generally, the storage capacity of a particular medium varies according to the number of physical defects or other blemishes that occur on the surface of the medium. Typically, a disk manufacturer will analyze a magnetic medium to determine whether that particular medium has sufficient capacity to be incorporated into a data storage cartridge. If the analysis shows the medium has a capacity above a predetermined capacity (for example, 100 MB), the medium may be used in a data storage cartridge. If the analysis shows that the capacity for that particular medium is below a certain predetermined capacity, the medium is not manufactured into a data storage cartridge and is typically discarded.

Unfortunately, if a large quantity of media do not have the requisite storage capacity and are discarded, costs increase for the manufacturer. Therefore, a need exists for methods and apparatuses that incorporate these lower capacity storage media in a data storage cartridges that can be read by a data storage device that is conventionally used to read/write to higher capacity data storage cartridges, thereby reducing manufacturing costs and other associated expenses.

SUMMARY OF THE INVENTION

The present invention satisfies the aforementioned need by providing apparatuses and methods for formatting a data storage device such as a data storage cartridge with magnetic storage medium therein to have a lower or reduced addressable capacity. Therefore, a magnetic medium that would otherwise be unsuitable for use in a disk drive because of an overabundance of non-addressable or otherwise unusable portions residing thereon, can be formatted for use in the disk drive, at a lower or reduced storage capacity.

An embodiment of the present invention is directed to a method of formatting a data storage cartridge having a data storage medium including a plurality of storage portions. The method comprises identifying a first quantity of the storage portions and labeling the first quantity of storage portions as non-addressable storage portions such that the non-addressable storage portions cannot be accessed by a user. Preferably, included in the first quantity of storage portions are portions of the medium that would otherwise be addressable.

BRIEF DESCRIPTION OF THE DRAWINGS

Other features of the present invention are further apparent from the following detailed description of the present invention taken in conjunction with the accompanying drawings, of which.

DETAILED DESCRIPTION OF THE PRESENT INVENTION

The present invention is directed methods and apparatuses for identifying a quantity of storage portions on the magnetic disk that are non-addressable (e.g. physically defective) and subsequently, labeling or otherwise flagging a quantity of addressable portions of the medium to non-addressable status such that the total of number of addressable portions is reduced to a predetermined amount. One advantage of the present invention is that it allows a manufacturer of magnetic disk cartridges to lower inventory costs by not having to discard magnetic media having an overabundance of non-addressable storage portions thereon.

For example, a magnetic storage medium may have a maximum of 120 MB of storage portions available thereon, but, due to physical defects, 30 MB are non-addressable and therefore not accessible to a user. Therefore, only 90 MB of storage space remains on the medium. Consequently, a manufacturer of 100 MB disks will be unable to use this medium in manufacturing 100 MB disks. However, the manufacturer may desire to market lower quantity disks, such as 75 MB disks. Accordingly, in accordance with the present invention, 15 MB of the 90 MB of addressable portions are partitioned or otherwise flagged as non-addressable portions, thereby leaving 75 MB of addressable portions. The manufacturer could then produce, from a previously unusable medium, a data storage cartridge having a capacity of 75 MB. This method allows a manufacturer to sell otherwise discardable magnetic media having a wide variety of storage capacities (e.g. due to physical defects) into disk cartridges having a uniform storage capacity.

Figure 1:
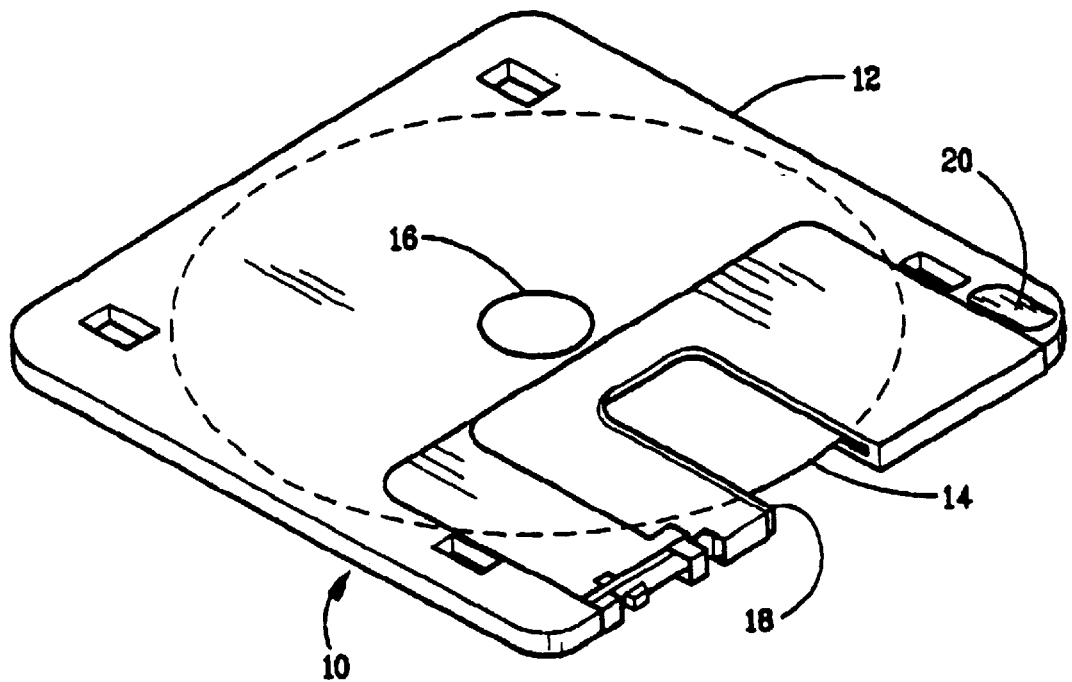
FIG. 1 is a perspective view of an exemplary data storage cartridge having a data storage medium therein in accordance with the present invention.

Referring now to the figures, FIG. 1 shows a perspective view of a data storage cartridge 10 in accordance with the present invention. FIG. 1 shows a data storage cartridge 10 having an outer housing 12 and a circular shaped data storage medium 14 (e.g. a magnetic storage medium) contained therein affixed to a hub 16 rotatably mounted in the housing 12. An opening at the bottom of the housing 12 provides access to the disk data storage hub and a head access opening in the front peripheral edge 18 of the housing 12 provides access for the read/write heads of a disk drive (not shown) to access the storage medium 14.

Figure 2:
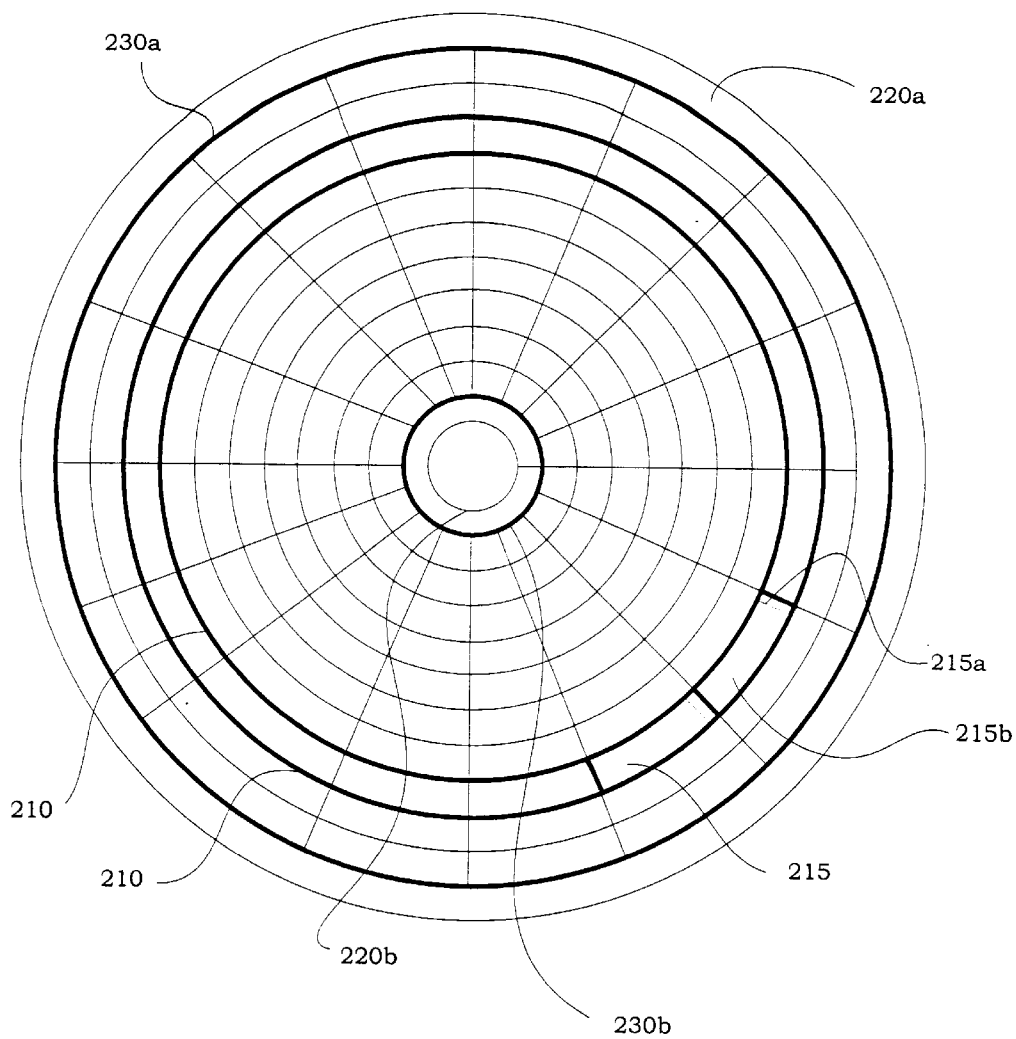
FIG. 2 is a top view of an exemplary data storage medium of FIG. 1.

FIG. 2 shows a top view of a magnetic data storage medium in accordance with the present invention, such as, for example, the data storage medium 14 of FIG. 1. The magnetic medium is of a round or disk-like shape and may be one of several different types. For example, the present invention may be employed with a magnetic medium for a ZIP™ data storage cartridge or JAZ™ data storage cartridge, both of which are manufactured by IOMEGA corporation, the assignee of the present invention.

In order for a disk drive system to read from and write to and the medium, the medium must be formatted. The formatting process partitions the surface of the medium into a number of concentric tracks 210. Furthermore, the formatting process also partitions each track into a fixed number of sectors 215. Preferably, the sectors 215 comprise a data field 215b having 512 bytes; however, in other embodiments, the data field 215b may have a different number of bytes. The sectors 215 also comprise an ID field 215a containing an address that is used to identify the sector and distinguish it from the other sectors. A JAZ™ disk, for example, may have 60 sectors per track or about one new sector every six degrees.

After partitioning the medium, each sector is analyzed to determine whether that sector is physically capable of holding data, i.e. addressable, or not physically capable of holding data, i.e. non-addressable. An addressable partition on the medium is one in good physical condition such that a unique address may be assigned to the partition and therefore accessible to the user. A non-addressable partition is one that, for example, is physically defective such that the partition is not capable of storing data and, therefore, not accessible to the user.

The addressable and non-addressable partitions are then flagged and located during the formatting process so the read/write mechanism only stores data in the partitions capable of storing data. After flagging the sectors, the formatting process may then write such flagging information on the medium to indicate to the reading/writing mechanism which sectors 215 and/or tracks 210 are addressable and non-addressable. Desirably, this information is stored on a Z-track on the medium. As shown in FIG. 2, the Z-track may be the outermost track 230a or innermost track 230b or both and may be on each side of the medium (not shown).

The medium may also include two guard band tracks 220a and 220b, located at the innermost and outermost tracks. The guard tracks 220a and 220b protect the read/write mechanism from damage due to travelling too far in or too far out during the reading/writing process.

Figure 3:
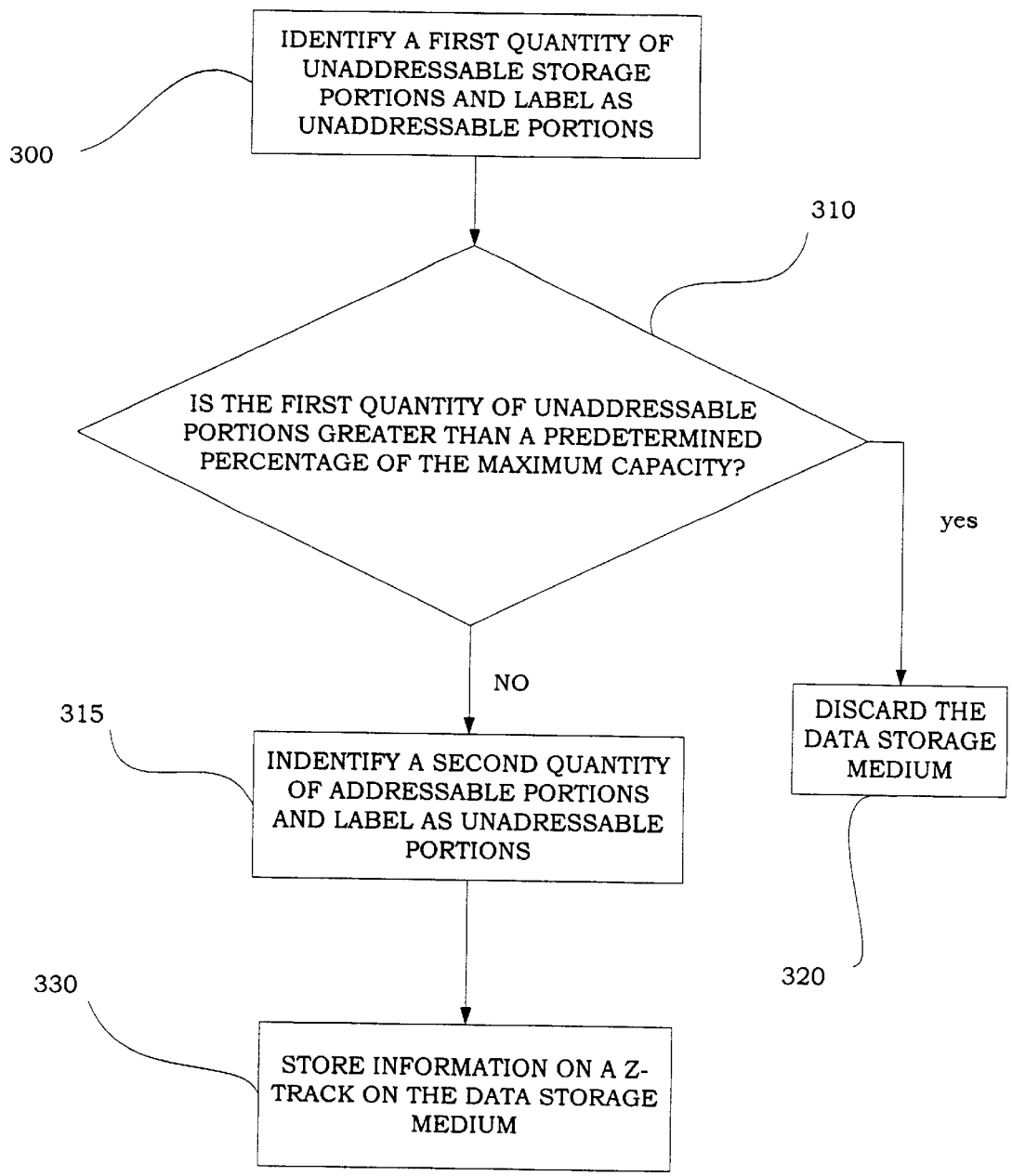
FIG. 3 is a flowchart illustrating an exemplary method of formatting a data storage medium in accordance with present invention.

FIG. 3 is a flowchart illustrating an exemplary method of formatting a disk in accordance with the present invention. First, a data storage medium is analyzed and a first quantity of storage portions are identified and labeled as non-addressable portions at step 300.

For example, in accordance with the present invention, a magnetic disk may be analyzed and found to have maximum storage capacity of 120 MB thereon. Subsequently, a first quantity of storage portions, for example, 30 MB is identified as non-addressable (e.g. physically defective) and therefore not accessible to a user. Therefore, only 90 MB of storage space remains on the medium. Then, for example, a second quantity of storage portions (e.g. 15 MB) that are addressable are labeled as non-addressable portions, thereby leaving 75 MB of addressable portions on the medium. It should be appreciated that the manufacturer may vary the second quantity of storage portions such that the final number of addressable portions (and thus the storage capacity of the medium and the finished storage product) may also vary.

In one embodiment of the present invention, if, at step 310, the first quantity of unaddressable storage portions is greater than a predetermined percentage of the maximum capacity, then the data storage medium is discarded at step 320. For example, if, after initially analyzing the medium, it is determined that 55% of the available storage portions are defective or non-addressable and the predetermined percentage is 50%, then, since 55% is greater than 50%, the medium is discarded. The predetermined percentage is preferably programmed and can be changed by a user or manufacturer.

More particularly with respect to step 300, preferably, all physically defective or non-addressable portions are identified as the first quantity of storage portions. Then, at step 315 (if the first quantity is not greater than the predetermined percentage at step 310), in addition to the non-addressable portions, a second quantity of addressable portions are also identified and labeled as non-addressable portions such that a predetermined number of addressable portions remain on the medium.

Preferably, labeling either the storage portions as non-addressable is accomplished by setting at least one flag associated with a starting track and an ending track of each of the labeled storage portions.

If the medium is not to be discarded, at step 330, information is stored on the data storage medium indicative of the non-addressable storage portions. In one embodiment, storing information comprises writing the information on the Z-track of the medium. In one embodiment of the present invention, the Z-track is located on the innermost and outermost tracks of the medium. In this manner, a conventional disk drive can access the data storage medium's addressable storage portions.

Therefore, using the method described above in accordance with the present invention, a manufacturer may manufacture a magnetic media, otherwise discardable, into a data storage cartridge having a lower storage capacity. Such data storage cartridge comprises a data storage medium and a housing. The data storage medium has a plurality of storage portions thereon with one portion identified as addressable portions and a second portion identified as non-addressable portions. The second portion comprises at least one addressable portion designated as a non-addressable storage portion.

The disk, as formatted in accordance with the present invention, has, for example, a capacity of 75 MB and can be used in a conventional disk drive that typically reads 100 MB disks. In this manner, the disk drive reads the disk formatted in accordance with the present invention as being 100 MB, but the disk drive may only have access to the 75 MB of addressable storage portions. It is appreciated that the present invention may be used to format optical disks and other non-magnetic disks and cartridgeless storage devices without departing from the scope of the present invention.

As the foregoing illustrates, the present invention is directed to methods and apparatuses for formatting a data storage cartridge having a data storage medium including a plurality of storage portions thereon. It is understood that changes may be made to the embodiments described above without departing from the broad inventive concepts thereof. For example, the resulting uniform storage capacity may vary. Accordingly, the present invention is not limited to the particular embodiments disclosed, but is intended to cover all modifications that are within the scope of the invention, as defined by the appended claims.

What is claimed is:

1. A method of formatting a data storage cartridge having a data storage medium including a plurality of storage portions, comprising:

identifying a first quantity of the storage portions and a second quantity of storage portions, the first quantity of storage portions being addressable and the second quantity of storage portions including at least one non-addressable storage portion and at least one addressable storage portion; and labeling the second quantity of storage portions as non-accessible.

2. The method of claim 1, wherein labeling the second quantity of storage portions as non-accessible prevents a disk drive from accessing the second quantity of storage portions.

3. The method of claim 1, further comprising storing information on the data storage medium indicative of the first and second quantity of storage portions.

4. The method of claim 3, wherein storing information comprises writing information on a Z-track.

5. The method of claim 1, further comprising determining the capacity of the data storage medium, and if the second quantity of storage portions is greater than a predetermined percentage of the capacity, appropriately identifying the data storage medium.

6. The method of claim 5, wherein if the second quantity of storage portions is greater than the predetermined percentage of the capacity, further comprising discarding the data storage medium.

7. The method of claim 1, wherein identifying the second quantity of the storage portions comprises identifying physical defects on the data storage medium.

8. The method of claim 1, wherein labeling the second quantity of storage portions as non-accessible comprises setting at least one flag associated with a starting sector and an ending sector of the second quantity of storage portions.

9. The method of claim 1, further comprising determining the capacity of the data storage medium, based on a capacity of the first quantity of storage portions.

* * * * *